United States Patent
Jiang et al.

(10) Patent No.: US 10,630,416 B2
(45) Date of Patent: Apr. 21, 2020

(54) SYSTEM AND METHOD FOR OPTICAL CHANNEL RECONFIGURATION

(71) Applicants: Zhiping Jiang, Kanata (CA); Yuren You, Ottawa (CA)

(72) Inventors: Zhiping Jiang, Kanata (CA); Yuren You, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/950,736

(22) Filed: Apr. 11, 2018

(65) Prior Publication Data
US 2019/0319734 A1    Oct. 17, 2019

(51) Int. Cl.
*H04J 14/02*   (2006.01)
*H04Q 11/00*   (2006.01)
*H04B 10/25*   (2013.01)

(52) U.S. Cl.
CPC .......... *H04J 14/0212* (2013.01); *H04B 10/25* (2013.01); *H04J 14/0221* (2013.01); *H04Q 11/0062* (2013.01); *H04Q 2011/0069* (2013.01)

(58) Field of Classification Search
CPC .. H04J 14/0212; H04J 14/0221; H04B 10/25; H04Q 11/0062; H04Q 2011/0069
See application file for complete search history.

(56) References Cited

U.S. PATENT DOCUMENTS

| | | | | |
|---|---|---|---|---|
| 6,040,933 A | * | 3/2000 | Khaleghi | H04J 14/0221 398/1 |
| 6,859,622 B1 | * | 2/2005 | Jiang | H04B 10/2537 398/193 |
| 9,503,188 B2 | | 11/2016 | Jiang et al. | |
| 2003/0151799 A1 | | 8/2003 | Wight et al. | |
| 2007/0280687 A1 | | 12/2007 | Wan et al. | |
| 2009/0324219 A1 | * | 12/2009 | Jiang | H04J 14/0221 398/34 |
| 2012/0321319 A1 | * | 12/2012 | Jiang | H04B 10/0793 398/79 |

(Continued)

FOREIGN PATENT DOCUMENTS

| | | |
|---|---|---|
| CN | 1419354 A | 5/2003 |
| CN | 101455005 A | 6/2009 |
| EP | 1439655 A2 | 7/2004 |

*Primary Examiner* — Mina M Shalaby

(57) ABSTRACT

In wavelength division multiplexing (WDM) systems, one optical multiplexing section (OMS) can support several channels. During a network reconfiguration, the number or channel index of the channels in the OMS may change, which may result in a change in gain for other channels in the OMS due to the channel loading dependant gain properties of many optical amplifiers. Equalization is therefore required in order to reduce power excursion for the channels in the OMS. Using a model for the channel loading dependent gain of optical amplifiers, equalization may be performed more quickly than using measurement-based equalization methods. The model predicts the change in gain for the channels in an OMS following network reconfiguration, and allows for an equalizer to quickly or pre-emptively adjust for the changes. This model may include an artificial neural network, which is trained using some of the possible channel loading conditions for the OMS.

23 Claims, 11 Drawing Sheets

(56) References Cited

U.S. PATENT DOCUMENTS

2014/0147113 A1* 5/2014 Auge ................ H04B 10/2935
398/26
2015/0333863 A1* 11/2015 Fujita ............... H04B 10/07955
398/34
2016/0315712 A1* 10/2016 Vassilieva ............ H04B 10/564

* cited by examiner

SYSTEM AND METHOD FOR OPTICAL CHANNEL RECONFIGURATION

FIELD

The application relates to systems and methods for optical channel reconfiguration.

BACKGROUND

In many optical telecommunication networks, such as wavelength-division multiplexing (WDM) networks, one transmission fiber can support a plurality of channels. These channels are subject to loss in the optical network, which includes loss from the transmission fiber. Optical amplifiers (OAs) are often implemented to compensate for this loss. However, the gain experienced in the OAs can vary for different channels. In response, equalizers are employed to optimize the power of each channel before transmission, which pre-adjusts for the varied gain experienced by different channels.

Although this method may be acceptable in steady-state conditions, problems arise when the network is reconfigured and the number of channels being amplified by an OA changes. The number of channels refers to how many channels are actually present at a given instant, as opposed to channels that have negligible power. The gain experienced by each channel being amplified by an OA is dependent on the other channels being amplified by the OA at the same time. Therefore, when the network is reconfigured and the number of channels being amplified by an OA changes, the gain for other channels being amplified by the OA will also change. This may lead to undesirable power excursion for the other channels, which reduces the network's performance. The equalizer must then be re-optimized to account for the new gain values for each channel.

Currently, optical networks rely on real-time measurement of the gain/loss experienced by each channel following network reconfiguration to re-optimize the channel power, which can often be a lengthy process. In addition, to avoid a large power excursion for the existing channels after the network is reconfigured but before the channel power is re-optimized, the number of channels is changed in small increments. This precaution further increases the time it takes to reconfigure the network. As such, there exists a need for quick and practical methods to reconfigure a network without causing a large power excursion in the existing channels.

SUMMARY

According to one aspect of the present invention, there is provided a method for reconfiguring a link with channel loading dependent gain in an optical network, the method comprising: adjusting optical power of at least one optical channel in the link to at least partially offset a predicted change of optical power of the at least one optical channel in the link due to optical gain change caused by reconfiguring optical channels in the link; and reconfiguring the optical channels in the link, the at least one optical channel remaining active following reconfiguration.

Optionally, the reconfiguring comprises adding a first set of optical channels to the link.

Optionally, the reconfiguring comprises dropping a second set of optical channels from the link.

Optionally, adjusting the optical power of the at least one optical channel comprises adjusting an optical power of each optical channel of the optical channels in the link remaining active following reconfiguration.

Optionally, adjusting the optical power of the at least one optical channel comprises adjusting the optical power by an amount equal to a specified negative fraction of the predicted change of optical power of the at least one optical channel due to the optical gain change.

Optionally, the specified negative fraction is −½.

Optionally, adjusting the optical power of the at least one optical channel comprises adjusting an attenuation level of the at least one optical channel in a wavelength selective switch.

Optionally, the method further comprises limiting a number of optical channels added to or dropped from the link during the reconfiguration of the optical channels in the link, such that a power excursion of the at least one optical channel due to the reconfiguration of the optical channels in the link is below a predefined threshold.

Optionally, the link is an optical multiplexing section comprising at least one optical amplifier.

Optionally, the at least one optical amplifier comprises an erbium-doped optical amplifier.

Optionally, the predicted change of optical power of the at least one optical channel in the link due to the optical gain change comprises a predicted change of optical power of the at least one optical channel in the link due to optical gain change of the at least one optical amplifier.

Optionally, the link is an optical multiplexing section comprising at least one optical amplifier and at least one section of optical fiber; wherein the at least one optical amplifier comprises an erbium-doped optical amplifier; and wherein the predicted change of optical power of the at least one optical channel in the link due to the optical gain change comprises a predicted change of optical power of the at least one optical channel in the link due to optical gain change of the at least one optical amplifier and the at least one section of optical fiber.

Optionally, the adjusting occurs, at least in part, before reconfiguring the optical channels in the link.

Optionally, the adjusting occurs, at least in part, in parallel with reconfiguring the optical channels in the link.

Optionally, the method further comprises calculating the predicted change of optical power of the at least one optical channel in the link due to the optical gain change using a numerical model.

Optionally, calculating the predicted change of optical power of the at least one optical channel in the link due to the optical gain change using the numerical model comprises calculating the predicted change of optical power of the at least one optical channel in the link due to the optical gain change using an artificial neural network.

Optionally, the method further comprises: dividing a set of optical channels to be added to the link into a plurality of subsets of optical channels to be added to the link in a corresponding plurality of reconfigurations; performing the plurality of reconfigurations by performing a corresponding plurality of iterations of the method of claim 1, the plurality of iterations including one iteration for each of the plurality of reconfigurations to add the corresponding subset of optical channels.

Optionally, dividing the set of optical channels comprises limiting the size of each of the plurality of subsets such that in each iteration, a power excursion of each of the optical channels in the link due to the reconfiguration for each iteration is below a predefined threshold.

According to another aspect of the present invention, there is provided an optical network controller comprising:

a prediction module configured to obtain a predicted change of optical power of at least one optical channel in a link with channel loading dependent gain due to optical gain change caused by reconfiguring optical channels in the link; a power adjuster configured to adjust an optical power of the at least one optical channel based on the predicted change of optical power of the at least one optical channel in the link due to the optical gain change; and a switch configured to reconfigure the optical channels in the link such that the at least one optical channel remains active following reconfiguration.

Optionally, the switch is configured to add a first set of optical channels to the link.

Optionally, the switch is configured to drop a second set of optical channels from the link.

Optionally, the prediction module, the power adjuster and the switch are parts of a reconfigurable optical add drop multiplexer node.

Optionally, the power adjuster is further configured to adjust an optical power of each optical channel of the optical channels in the link remaining active following reconfiguration.

Optionally, the power adjuster is further configured to adjust the optical power of the at least one optical channel by an amount equal to a specified negative fraction of the predicted change of optical power of the at least one optical channel in the link due to the optical gain change.

Optionally, the power adjuster and the switch comprise a same wavelength selective switch configured to adjust an attenuation level of the at least one optical channel.

Optionally, the power adjuster is further configured to adjust the optical power of the at least one optical channel before the switch reconfigures the optical channels in the link.

Optionally, the power adjuster is further configured to adjust the optical power of the at least one optical channel in parallel with the switch reconfiguring the optical channels in the link; and the prediction module is further configured to obtain the predicted change of optical power of the at least one optical channel in the link due to the optical gain change by calculating the prediction using a numerical model.

Optionally, the numerical model comprises an artificial neural network.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION

Figure 1:
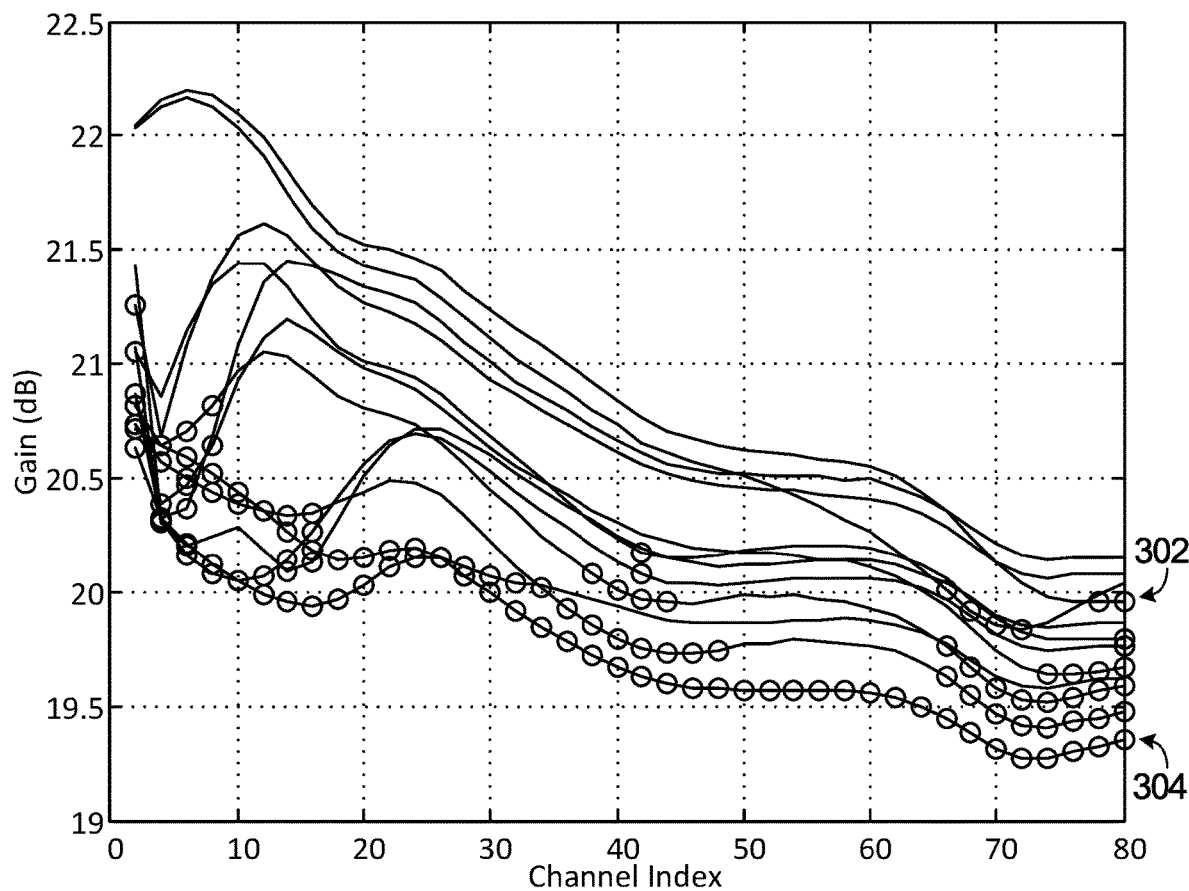
FIG. 1 is a plot of measured gain in an erbium doped fiber amplifier (EDFA) as a function of channel index.

Generally, embodiments of the present disclosure provide a method and system for optical channel reconfiguration using model-based equalization.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

As explained above, the gain experienced by each channel being amplified by an OA is dependent on the other channels being amplified by the same OA. Referring now to FIG. 1, shown is a plot of measured gain in an EDFA as a function of channel index. Several measurements of gain in the EDFA were taken under different channel loading conditions, which are shown as different curves in FIG. 1, including curves 302,304.

In FIG. 1, channel index may correspond to, for example, the center wavelength of a channel in a WDM network. Each curve of FIG. 1 differs in the configuration of channels being amplified by the EDFA during the gain measurement. An active channel in FIG. 1 is represented as a circle on a curve, wherein the location of the circle corresponds to that channel's index. Active channels are channels that are in-service, for example, channels carrying signals. For each measurement, the nominal gain of the EDFA is set to 20 dB. As such, the average gain of each channel for a given curve is approximately 20 dB.

FIG. 1 illustrates that the gain experienced by a channel being amplified by an EDFA depends on that channel's index and the presence of other active channels being amplified by the EDFA at the same time. In the example of curve 302, only channels with channel index 78 and channel index 80 are being amplified by the EDFA. As such, the gains of channels with channel index 78 and channel index 80 are very close to 20 dB. In the example of curve 304, every even channel from channel index 2 to channel index 80 is active. In this case, even though the nominal gain has not changed, the gains for the channels having channel index 78 and channel index 80 dropped below 19.5 dB. Therefore, a change in the channels being amplified by an OA will result in a gain change in the existing/remaining channels being amplified by the OA.

Figure 2:
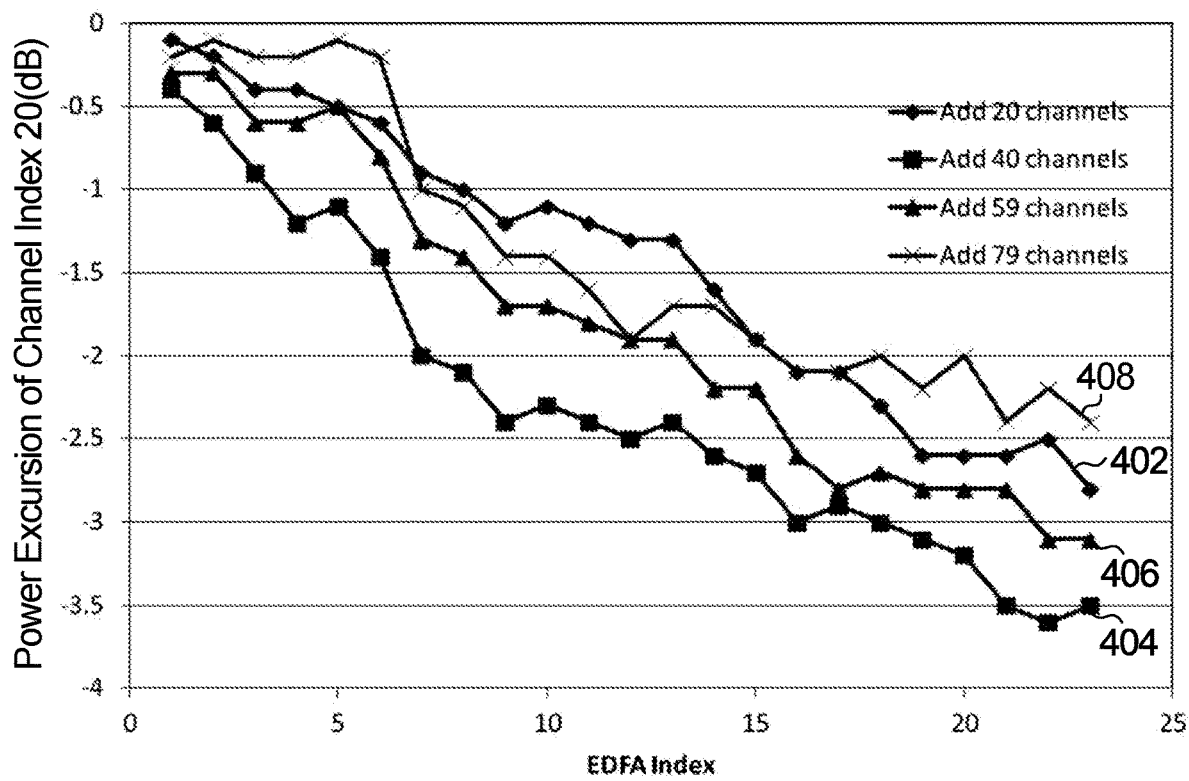
FIG. 2 is a plot of the power excursion of a channel with channel index 20 as a function of EDFA index in an optical multiplexing section (OMS)

Referring now to FIG. 2, shown is a plot of the power excursion of a channel with channel index 20 as a function of EDFA index in an OMS. The results of FIG. 2 were measured in an experimental set-up. The EDFA index is the number of EDFAs that the channel with channel index 20 has traversed at the time of a power excursion measurement. Measurements of power excursion for the channel with channel index 20 were made after 20, 40, 59 and 79 channels were added, as shown in curves 402, 404, 406 and 408, respectively. No channel equalization was performed following the addition of channels.

FIG. 2 illustrates that, following the addition of other channels, the power excursion experienced by an existing channel being amplified by one EDFA will, on average, be similar to the power excursion experienced in subsequent EDFAs. Therefore, power excursion is substantially coherent over multiple OAs. Although there is variation in curves 402, 404, 406 and 408 due to variability among the EDFAs, a clear downward trend is apparent as EDFA index increases. The result is that increasing the number of OAs in an OMS will increase the power excursion experienced by a channel following reconfiguration of the network.

As illustrated in FIGS. 1 and 2, changes to the number or channel index of channels traversing a link in the optical network may lead to power excursion in existing channels due to channel dependent gain characteristics of OAs. At reconfigurable optical add-drop multiplexer (ROADM) nodes in an optical network, channels may be added to a link in the optical network from a transmitter, dropped from a link in the optical network to a receiver, or re-routed from one link in the optical network to another link in the optical network. The add, drop and re-routing operations are what determine the channels in a given link in the optical network. For example, a channel added at one ROADM node may be re-routed through several OMS and before being dropped at another ROADM node. Multiple OMS may be traversed by a channel sequentially or in parallel. During network reconfiguration, the channels re-routed, added or dropped at any given ROADM node may change to accommodate network demand. Further, if there is fiber cut and channels are lost in the affected link, the affected channels may be re-routed to other fiber links, which is called restoration. From a power excursion point of view, re-routing or restoration of a channel are essentially the same as channel add/drop operations, as each may affect the number, the index and the power of channels amplified by an OA. Power excursion can be either negative or positive for a given channel. Negative power excursion leads to a lower optical signal-to-noise ratio (OSNR), and positive power excursion leads to larger fiber nonlinearity. Therefore, power excursion has to be maintained to an acceptable level.

Figure 3A:
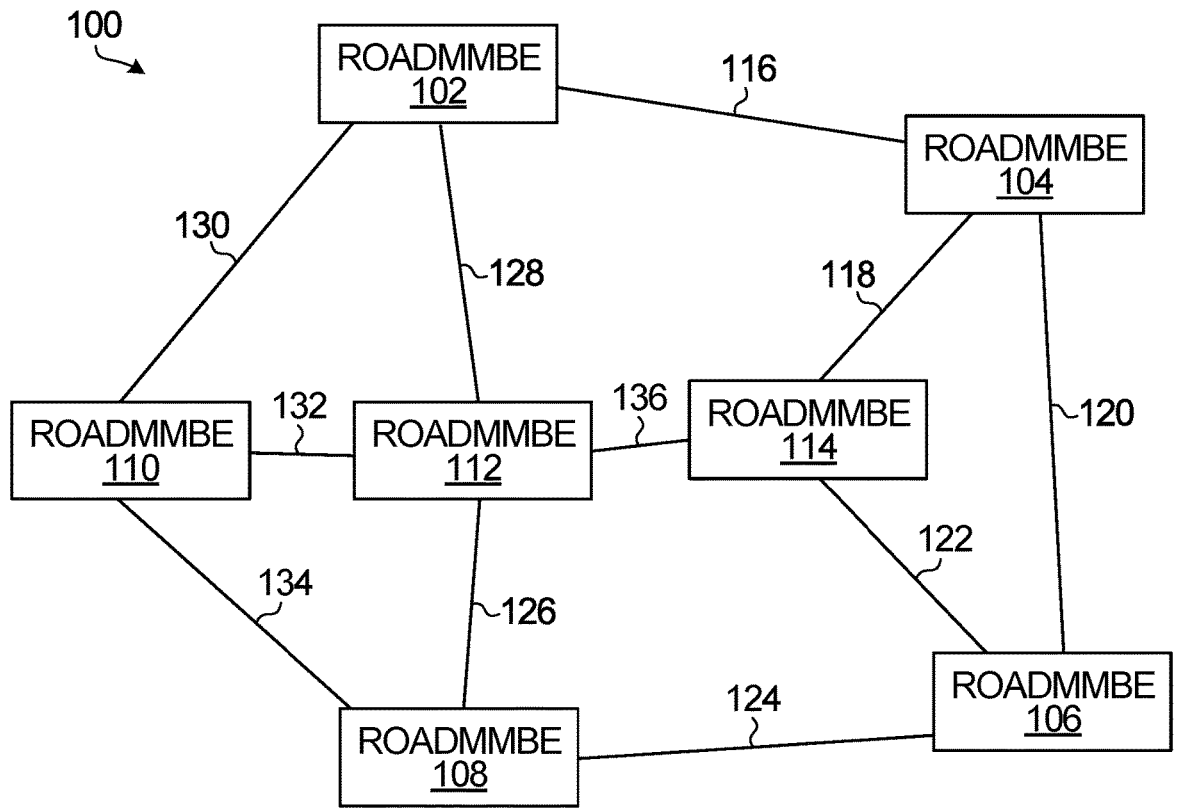
FIG. 3A is a block diagram of an optical network provided by an embodiment of the invention.

Referring now to FIG. 3A, shown is a block diagram of an optical network 100 provided by an embodiment of the invention. The optical network 100 includes a plurality of reconfigurable optical add-drop multiplexer with model-based equalization (ROADMMBE) nodes 102,104,106,108, 110,112,114. An optical multiplexing section (OMS) is a section of the optical network which includes two optical add-drop multiplexer (OADM) nodes, such as ROADM-MBE nodes, and the optical link between them. For example, the network of FIG. 3A includes OMS 116, which includes ROADMMBE node 102 and ROADMMBE node 104. The network also includes OMS 118,120,122,124,126,128,130,132,134,136. The degree of an ROADMMBE node is equal to the number of OMS it is a part of. For example, ROADMMBE node 102 is of degree 3.

It should be understood that embodiments of the invention are not limited to the specific optical network 100. More generally, the optical network includes some number of optical network controllers which may include optical add-drop multiplexer (OADM) nodes and reconfigurable OADM (ROADM) nodes, at least one of which is an ROADMMBE node. In some embodiments, the optical network 100 may comprise a mesh network as illustrated, and/or a linear optical network.

Figure 3B:
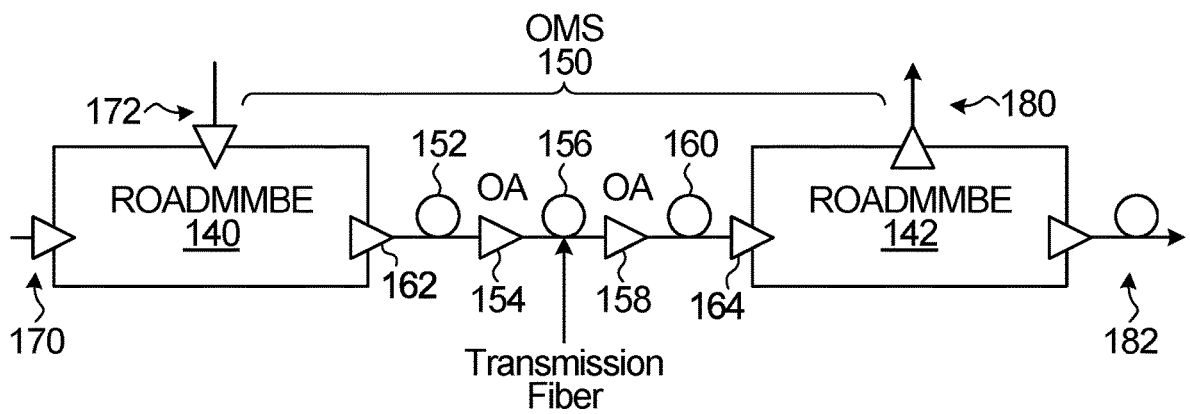
FIG. 3B is a detailed view of an example implementation an optical multiplexing section including two third-degree reconfigurable optical add drop multiplexers with model-based equalization (ROADMMBE) nodes.

FIG. 3B provides a detailed view of an example implementation an OMS 150 including two third-degree ROADMMBE nodes 140,142. ROADMMBE node 140 is also part of OMS 170,172 and ROADMMBE node 142 is also part of OMS 180,182. The OMS 150 includes optical amplifier (OA) 162, transmission fiber 152, OA 154, transmission fiber 156, OA 158, transmission fiber 160, and OA 164. OA 162 is a part of ROADMMBE node 140, and OA 164 is a part of ROADMMBE node 142.

A link in an optical network may comprise one or more OMS, such as OMS 150. While the OMS 150 of FIG. 3B illustrates three transmission fibers and four OA nodes, more generally, an OMS may comprise one or more transmission fibers. The OMS may further comprise one or more OA nodes, wherein the OA(s) are connected between the different transmission fibers. Sometimes an OA may be part of a ROADMMBE such as OAs 162,164, and sometimes an OA may be a standalone node, such as OAs 154,158. OAs may also be provided at the input and output of the ROADM-MBE nodes.

The OMS are capable of supporting the transmission of at least one channel. The channel(s) may comprise signals for use in data communication. Multiplexing is used in the case where the OMS support more than one channel. In some embodiments, the channels may be represented by different optical wavelengths, such as those used in wavelength-division multiplexing (WDM) networks. In other embodiments, the channels may be represented by different spatial modes, such as those used in spatial-division multiplexing networks. Although the embodiments described herein are described in the context of optical signals, one skilled in the art would appreciate that electromagnetic signals of any form may be implemented in the present invention. Furthermore, although the embodiment shown in FIG. 3B depicts channels traveling in one direction in OMS 150, one skilled in the art would recognise that channels may travel in both directions in an OMS.

In the example described, transmission fibers are used to guide the channels between OAs. Although referred to as transmission fibers in the present disclosure, one skilled in the art would recognise any media capable of supporting electromagnetic signals is included in the scope of this invention. In some embodiments, the transmission fiber may comprise single-mode or multimode optical fiber. In other embodiments, the transmission fiber may comprise planar waveguides such as silicon photonic waveguides.

The OAs of an OMS may be implemented to compensate for loss experienced by the channels in the transmission fibers. In some embodiments, an OA may be an erbium-doped fiber amplifier (EDFA).

With continued reference to FIG. 3B, at each ROADM-MBE node 140,142, channels may be added to an OMS, dropped from an OMS, or re-routed from one OMS to another OMS. In some embodiments, channels may traverse several OMS and ROADMMBE nodes before being dropped. An OA at the output of a ROADMMBE node, for example OA 162, may be used to amplify the channels for transmission on a transmission fiber. An OA may also be used at the input to a ROADMMBE node, for example OA 164, for amplification of the channels before add, drop or re-routing operations.

Figure 4:
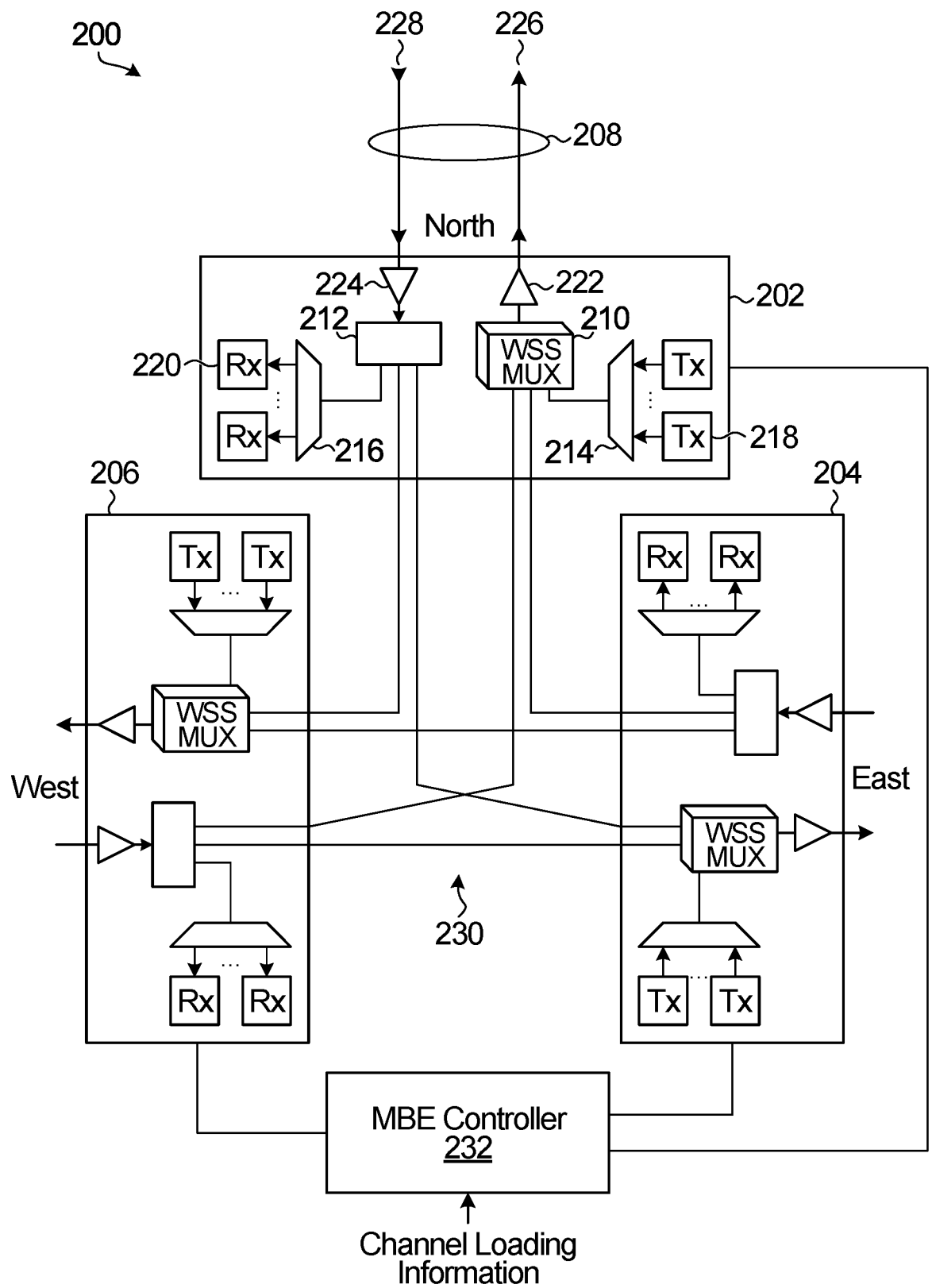
FIG. 4 is a block diagram of a 3-degree ROADMMBE node provided by an embodiment of the invention.

Referring now to FIG. 4, shown is a block diagram of a 3-degree ROADMMBE node 200 according to one embodiment of the invention. ROADMMBE node 200 includes interface units 202,204,206, which correspond to three different OMS. Interface unit 202 will be described by way of example, as the functionality of the other interface units is similar. The interface unit 202 is part of OMS 208, and includes a wavelength selective switch multiplexer (WSS mux) 210, a wavelength selective switch demultiplexer (WSS demux) 212, a multiplexer 214, a demultiplexer 216, transmitters 218, receivers 220, an output OA 222 and an input OA 224. An input 228 to interface unit 202 and an output 226 from interface unit 202 are also shown. Similar features are illustrated in interface units 204 and 206. Routing connections 230 are provided between interface units 202,204,206. Also shown in FIG. 2 is a model-based equalization (MBE) controller 232.

In interface unit 202, the input 228 connects to OA 224, which is then connected to the input of WSS demux 212. One output of the WSS demux 212 is connected to demultiplexer 216, which connects to one or more receivers 220. Additional outputs of the WSS demux 212 are connected to the other interface units in ROADMMBE node 200 through routing connections 230.

Further, in interface unit 202, the output 226 connects to an OA 222, which is connected to the output of WSS mux 210. One input of the WSS mux 210 is connected to multiplexer 214, which is connected to one or more transmitters 218. Additional inputs of WSS mux 210 are connected to the other interface units in ROADMMBE node 200 through routing connections 230.

The model-based equalization (MBE) controller 232 is shown connected to each of the interface units 202,204,206 in ROADMMBE node 200. Channel loading information is provided to the MBE controller 232.

Each interface unit 202,204,206 is a part of a different OMS. OA 224 may be used to amplify channels at the input 228 of the interface unit 202 before the WSS demux 212. In the WSS demux 212, individual channels may be dropped or re-routed, based on the configuration of the network.

In order to perform a channel drop operation, the WSS demux 212 switches the set of channels to be dropped to a demultiplexer 216. The demultiplexer 216 then demultiplexes the set of channels to be dropped into individual channels and outputs these on distinct connections leading to receivers 220.

In order to perform channel re-routing for channels in OMS 208, the WSS demux 212 switches some channels to other OMS through their corresponding interface units. In this case, the WSS demux 212 switches these channels into one or more of the routing connections 230 connected to the WSS mux of the other interface units.

In some embodiments, the WSS demux 212 may comprise a splitter, wherein each input channel to the WSS demux is split between the outputs of the WSS demux. Here, all channels received by the WSS demux are sent to the receivers 220, as well as into each routing connection 230. Channel dropping actions are then performed at the receivers 220, and channel re-routing actions are performed at the WSS mux of the other interface units.

In order to perform a channel add operation, channels to be added on OMS 208 may originate at transmitters 218, which are then multiplexed using multiplexer 214. The added channels are then multiplexed with channels received from other interface units over the routing connections 230 by the WSS mux 210 and amplified at OA 222 before transmission on output 226. In general, WSS mux 210 multiplexes the added channels and the re-routed channels for transmission on the same output.

In some embodiments, the WSS mux 210 has equalization functionality. During equalization, the power of each of the one or more channels at the output of the WSS mux is adjusted under control from the MBE controller 232. More specifically, an adjustable attenuation level can be applied to each channel.

In the illustrated example, the MBE controller 232 is shown as a component of the ROADMMBE node that is connected to each interface unit. Alternatively, the MBE controller 241 may be part of one of the interface units. In another embodiment, the MBE controller 232 is separately located from the ROADMMBE node, for example in another ROADMMBE node or a network management entity. A single MBE controller 232 may be used to configure multiple ROADMMBE nodes.

In some embodiments, model-based equalization is performed such that the power of each channel is substantially equal upon arrival at the following ROADMMBE node. In other embodiments, model-based equalization is performed to reduce gain ripple and spectral hole burning in the OA of the OMS. Detailed examples are provided below. In further embodiments, model-based equalization is performed to reduce non-linear optical effects in the optical network. Although the embodiments described herein perform equalization of the channels in the WSS mux, one skilled in the art would recognise other components may be used, independently or in combination, for equalization.

As an input to controlling the model-based equalization performed in the WSS mux 210, the MBE controller 232 is provided with channel loading information, which may be provided by, for example, a network management entity. In general, the channel loading information includes information about the configuration of the channels in the optical network. In some embodiments, the channel loading information may include the current and future active channels in one or more OMS in the optical network. In other embodiments, the channel loading information may include information about channels currently being added, dropped and re-routed at one or more interface units. In further embodiments, the channel loading information may include information about the reconfiguration of channels in the optical network. For example, reconfiguration may modify the channels being added, dropped and re-routed at one or more interface units.

The MBE controller 232 includes a prediction module that uses the channel loading information to predict the power excursion for the channels traversing one or more OMS. The power excursion prediction may account for the loss and stimulated Raman scattering (SRS) experienced by each channel in the transmission fibers making up the OMS, as well as the gain each channel experiences in the OAs making up the OMS. As described above, the gain each channel experiences in an OA is a function of the channels collectively being amplified by the OA. In some embodiments, the power excursion prediction may then be used by the WSS mux for the purpose of performing equalization. When the channel loading information indicates a change to the channels in an OMS, the prediction module may then compute updated power excursion predictions for the existing channels. This information may then be used to control the equalization being performed in a WSS mux. In some embodiments, the MBE controller may allow for equalization in the optical network to be performed more quickly than using measurement-based techniques.

In some embodiments, channels are added iteratively, with model-based equalization being performed for each channel add operation. Advantageously, this can result in a reduced overall power excursion. Detailed examples are provided below.

Figure 5:
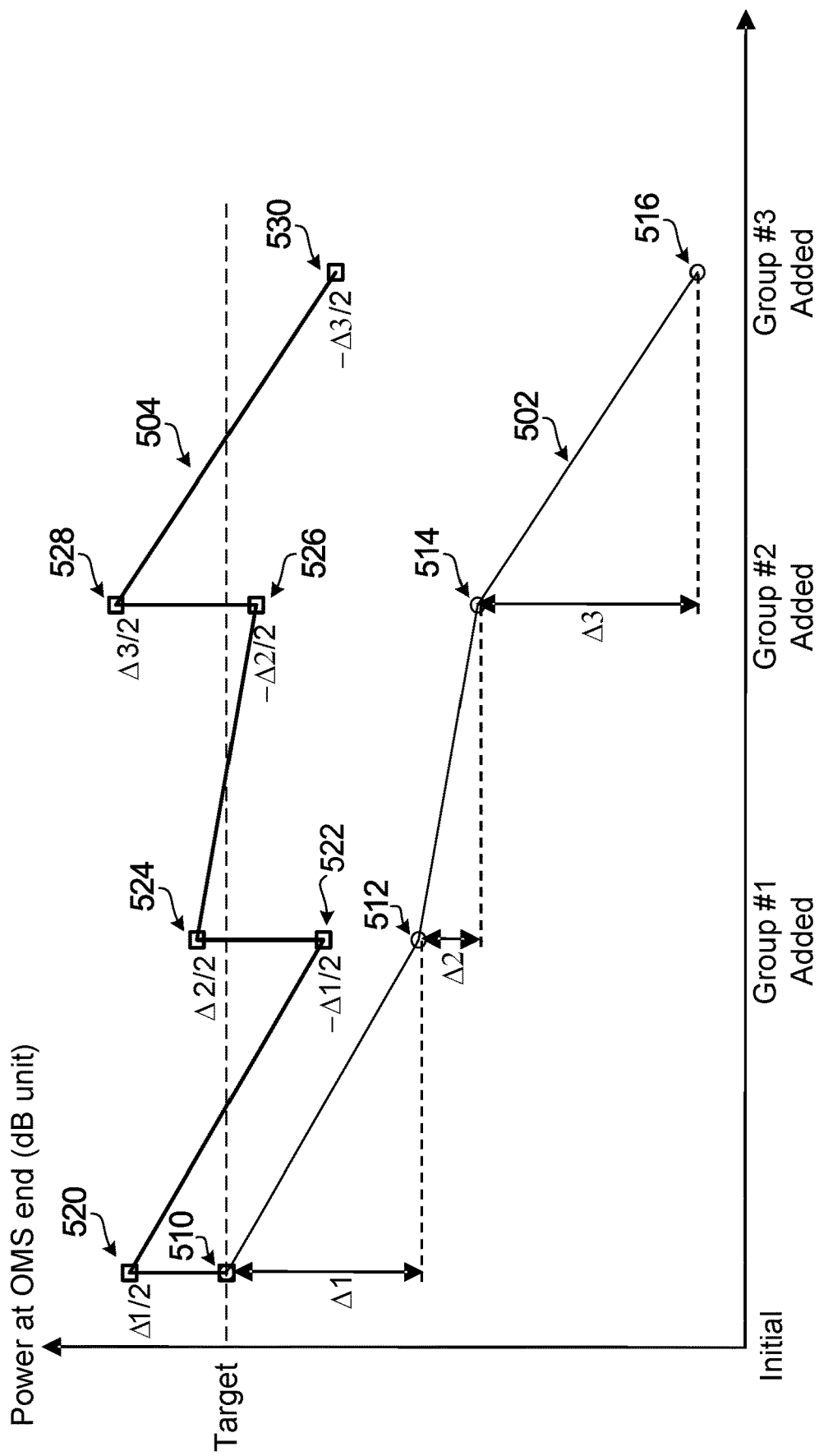
FIG. 5 is a plot of the power evolution of a single channel at the end of an OMS during an iterative channel add operation.

Referring to FIG. 5, shown is a plot of the power evolution of a single channel at the end of an OMS during an iterative channel add operation. FIG. 5 includes curve 502, which includes data points 510,512,514,516, for an iterative channel add operation with no model-based equalization. FIG. 5 also includes curve 504, which includes data points 510, 520,522,524,526,528,530, for the same channel add operation with model-based equalization. The data points in FIG. 5 are hypothetical but representative of a possible iterative channel add operation.

During the iterative channel add operation illustrated in FIG. 5, three groups of channels are added sequentially. The addition of the three groups of channels represents an example of network reconfiguration. Each group includes at least one channel, which may be added to the OMS from a transmitter, or re-routed to the OMS from another OMS. The horizontal axis represents the different stages of the channel add operation, including initial, group #1 added, group #2 added and group #3 added stages. The vertical axis represents the power of the channel at the end of the OMS. The target power for the channel is indicated on the vertical axis, from which power excursion of the channel is measured.

Curve 502 of FIG. 5 will now be described, which illustrates the power excursion of the channel without equalization between the stages of the iterative channel add operation. At the initial point 510, the channel is at the target power. At point 512, group #1 is added to the OMS and the channel experiences a power excursion equal to −Δ1. At point 514, group #2 is added to the OMS and the channel experiences an additional power excursion equal to −Δ2. At point 516, group #3 is added to the OMS and the channel experiences a further power excursion equal to −Δ3. These power excursions are due, at least in part, to the channel dependent gain properties of the OAs in the OMS discussed in detail above. In the example of curve 502, the absence of equalization leads to a large power excursion in the channel equal to −(Δ1+Δ2+Δ3) at point 516.

Curve 504 of FIG. 5 will now be described, in which power excursion is reduced in the channel using model-based equalization. At the initial point 510, the channel is at the target power. Before group #1 is added, a model-based equalizer predicts the power excursion M the addition of group #1 will cause for that specific channel. In some embodiments the prediction is computed using a prediction module in a MBE controller. Using the power excursion prediction, the power of the channel is pre-adjusted by +Δ½ at point 520. After group #1 is added at point 522, the resultant power excursion is −Δ½. As such, the maximum power excursion for the channel due to the addition of group #1 is reduced by half by the power pre-adjustment. In some embodiments the power pre-adjustment is performed by a WSS mux after receiving a command from the MBE controller. Similar power pre-adjustments for group #2 and group #3 are performed at point 524 and point 528, respectively. Point 526 and point 530 represent the resultant power excursions after the addition of group #2 and group #3, respectively. In the example of curve 504, no measurement-based equalization is used, which may reduce the time required for reconfiguration of the network and equalization of the channels. Moreover, reduced power excursion is achieved in curve 504 compared to the example of curve 502 due to the power pre-adjustment.

Although curve 504 of FIG. 5 illustrates power pre-adjustments equal to −½ the power excursion predictions for points 520, 524 and 528, in general, any fraction of the power excursion predictions that is greater than 0 and no larger than −1 may be used for power pre-adjustment.

Figure 6:
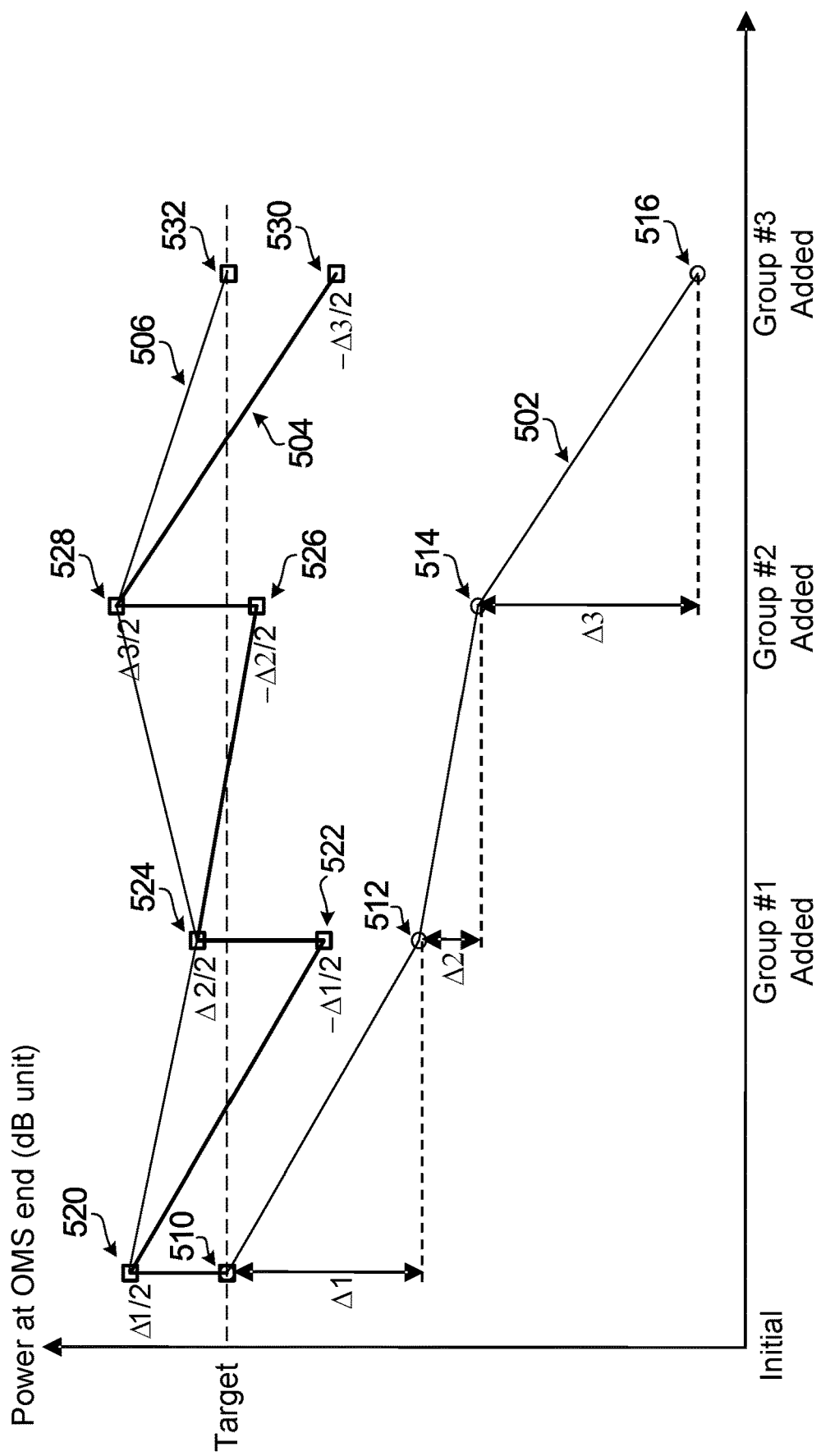
FIG. 6 is another plot of the power evolution of the channel at the end of an OMS during an iterative channel add operation.

In some embodiments, a single device, such as a WSS mux, performs both the channel add and power pre-adjustment operations. Therefore, these operations may be combined into a single step. This is illustrated in FIG. 6. FIG. 6 shows a plot of the power evolution of a channel at the end of an OMS during an iterative channel add operation, similar to FIG. 5. FIG. 6 includes curves 502 and 504 of FIG. 5, and as well as new curve 506 and new point 532.

Referring now to curve 506 of FIG. 6, channel add and power pre-adjustment operations are shown as a single step. For example, from point 520 group #1 is added to the OMS at the same time a power pre-adjustment is applied. This allows curve 506 to bypass point 522 and proceed directly to point 524. A similar operation is performed between point 524 and point 528, bypassing point 526. As group #3 is added, a pre-adjustment of +Δ3/2 is also applied such that curve 506 proceeds directly to point 532, which is at the target power. In the embodiment of curve 506, the time required for optical network reconfiguration and channel equalization may be reduced by combining the channel add and power pre-adjustment operations.

In further embodiments of FIGS. 5 and 6, the grouping of channels to be added to the OMS may be optimized by the MBE controller such that power excursion is reduced for the channel. For example, the division of channels in group #1, group #2 and group #3 may be chosen such that the values of Δ1, Δ2 and Δ3 are reduced.

Although FIGS. 5 and 6 relate to power excursion and model-based equalization for a single channel in an OMS, the methods and concepts discussed therein may be applied to any number of channels in an OMS. In general, the prediction module in the model-based equalizer generates a power excursion prediction for each channel that exists in the OMS following an iterative channel add operation. In addition, although FIGS. 5 and 6 relate to the addition of channels to an OMS, similar methods and concepts apply to channel drop operations, which may be performed independent from or in conjunction with channel add operations. Furthermore, although FIGS. 5 and 6 illustrate a fixed target power for the channel at the end of the OMS, in practice the target may vary between the channel add stages. In such cases, model-based equalization would account for the new target during the calculation of power pre-adjustments and/or channel grouping. In other implementations, no power pre-adjustment is applied, and model-based equalization is performed after channel add or drop operations.

Figure 7:
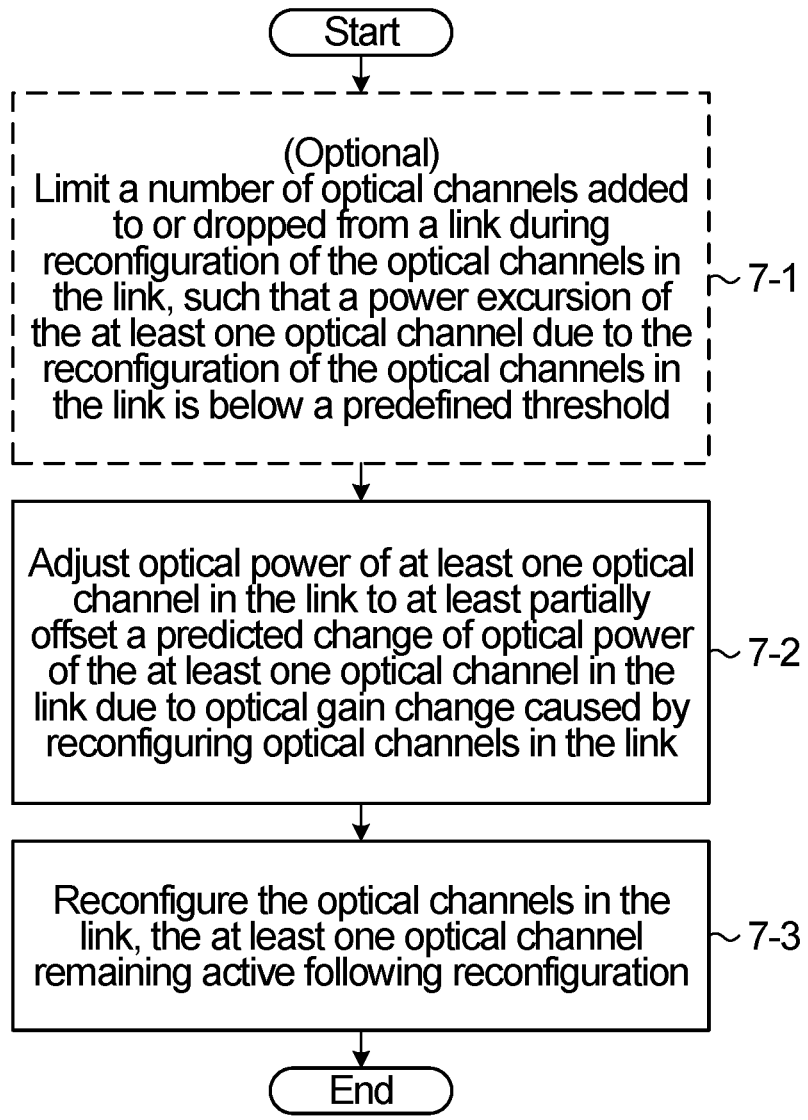
FIG. 7 is a flow diagram of a method for reconfiguring an optical network provided by an embodiment of the invention.

Referring now to FIG. 7, shown is a flow diagram outlining a method for reconfiguring an optical network. FIG. 7 includes blocks 7-1, 7-2 and 7-3. Block 7-1 is shown as a dashed box to indicate it is an optional block.

Optionally, the method of FIG. 7 begins with block 7-1, which involves limiting the number of optical channels added to or dropped from a link during reconfiguration of the optical channels in the link. This step is performed when there are a large number of channels to add to reduce the power excursion for at least one optical channel that occurs as a result of reconfiguring the optical channels in the link, such that the power excursion is below a predetermined threshold. Power excursion for an optical channel during network reconfiguration is described in greater detail above with reference to FIG. 4.

In block 7-2, the optical power of at least one optical channel in the link is adjusted. The link may be an OMS including at least one OA, which may further include an EDFA with channel loading dependent gain. The link may further include at least one section of optical fiber. Examples of channel loading dependent gain are provided above with reference to FIG. 1. In some embodiments, the power of each optical channel of the optical channels in the link which remain active following reconfiguration is adjusted.

The adjustment of block 7-2 is performed to at least partially offset a predicted change of optical power of the at least one optical channel in the link due to optical gain change caused by reconfiguring optical channels in the link. Reconfiguring the optical channels in the link may include an add, drop and/or re-routing operation being performed during a network reconfiguration. The add, drop and/or re-routing operation may be performed by an optical network controller such as a ROADMMBE node. In addition, adjusting the optical power of the at least one optical channel may be achieved by adjusting an attenuation level applied to the at least one optical channel in a WSS. The optical gain change may be due to the channel loading dependent gain properties of the link.

The predicted change of optical power of the at least one optical channel in block 7-2 may be calculated by a prediction module using a numerical model, for example, an artificial neural network. In some embodiments, this calculation is performed in a MBE controller. In the case that the link is an OMS including at least one OA, which may further include an EDFA, the prediction includes a prediction of an optical gain change of the at least one OA caused by reconfiguring optical channels in the link. Further, in the case that the OMS also includes at least one section of optical fiber, the prediction may also include a prediction of an optical gain change of the at least one OA and the at least one section of optical fiber caused by reconfiguring optical channels in the link In block 7-3 of FIG. 7, the optical channels in the link are reconfigured such that the at least one optical channel remains active following reconfiguration. Although FIG. 7 depicts the optical power adjustment of the at least one optical channel in block 7-2 occurring before the optical channels in the link are reconfigured in block 7-3, alternatively, these steps are performed in parallel. Further, the optical power adjustment may be performed in parts, such that power is adjusted before, after and/or in parallel with reconfiguring the optical channels in the link. In some embodiments the optical power of the at least one optical channel is adjusted by an amount equal to a specified negative fraction of a predicted change of optical power of the at least one optical channel due to the optical gain change. For example, the specified negative fraction may be −½. This embodiment is discussed in further detail above with reference to FIG. 5.

Figure 8:
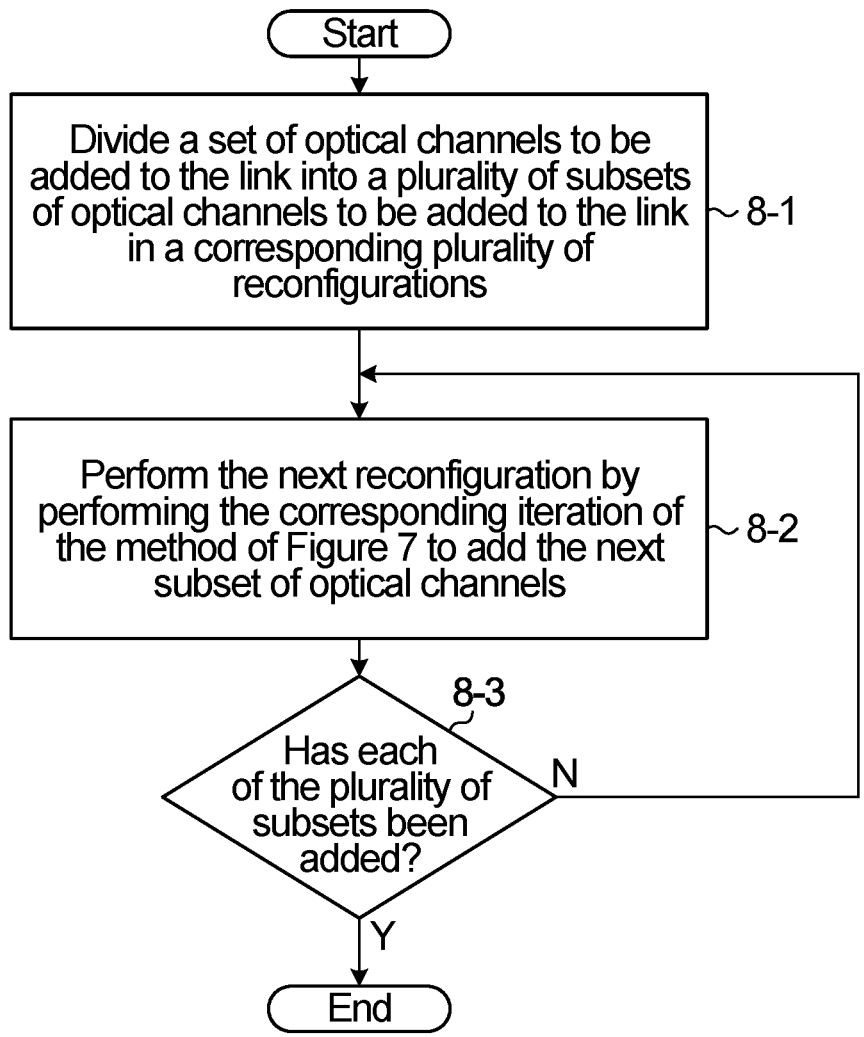
FIG. 8 is a flow diagram of a method of performing a plurality of network reconfigurations by performing a corresponding plurality of iterations of the method of FIG. 7.

Referring now to FIG. 8, shown is a method of performing a plurality of network reconfigurations by performing a corresponding plurality of iterations of the method of FIG. 7. FIG. 8 includes blocks 8-1, 8-2 and 8-3.

In block 8-1 of FIG. 8, a set of optical channels to be added to a link is divided into a plurality of subsets of optical channels to be added to the link in a corresponding plurality of reconfigurations. In some embodiments, the size of each of the plurality of subsets is limited such that in each iteration, the power excursion of each optical channel of the optical channels in the link due to the reconfiguration for each iteration is below a predefined threshold.

In block 8-2 of FIG. 8, the network is reconfigured by performing the corresponding iteration of the method depicted in FIG. 7 to add the next (or first) subset of optical channels.

Block 8-3 involves determining if each of the plurality of subsets has been added. In other words, has each of the plurality of subsets of optical channels been added in a corresponding plurality of reconfigurations. If no, the method returns to block 8-2 to perform the next iteration. If yes, the method ends.

As discussed above, the prediction of an optical gain change applied by a link in block 7-2 of FIG. 7 may be calculated using a numerical model, for instance, the model in the prediction module of an MBE controller. However, this prediction may be difficult to calculate using first principle models. For example, the gain profile of an EDFA is a complicated function of its operating conditions, such as wavelength, gain, input power, gain tilt and channel loading. FIG. 1 illustrates the complex relationship between channel loading and gain in an EDFA. Moreover, for a large number of possible channels, it is infeasible to measure the gain profile for each channel loading condition.

In some embodiments, an artificial neural network (ANN) model is used to calculate the gain of an EDFA. The ANN model is trained using a series of gain profiles measured for an EDFA under different channel loading conditions. In general, the measured channel loading conditions represent some but not all of the possible channel loading conditions. The trained ANN model can then be used to calculate gain profiles for other channel loading conditions that were not directly measured. The measurement of EDFA gain profiles used to train the ANN model will now be discussed in detail.

Figure 9:
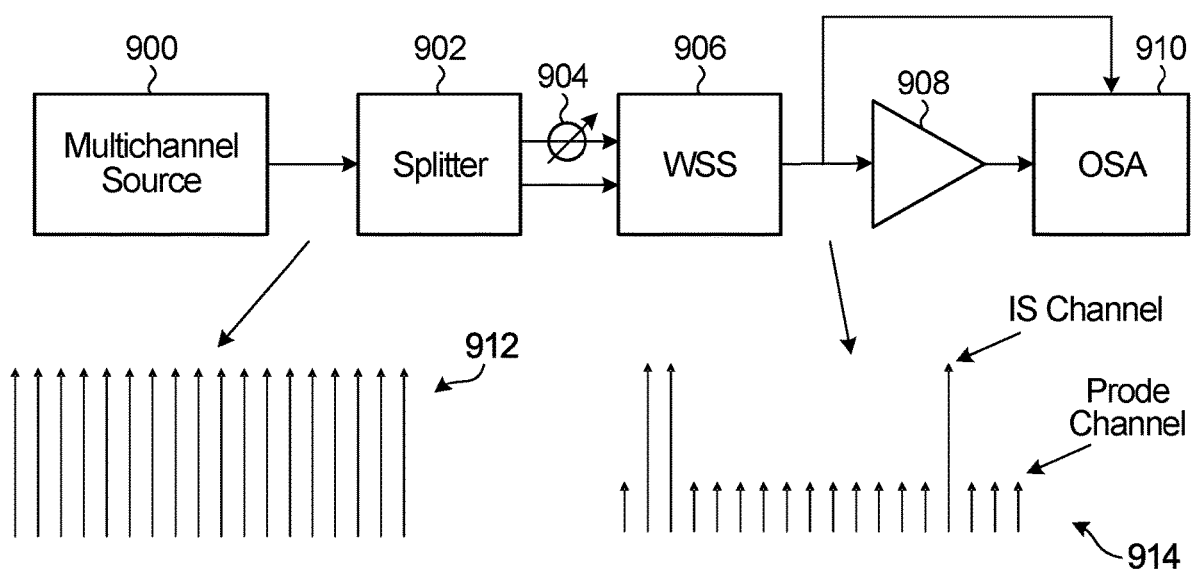
FIG. 9 is a block diagram of an apparatus for measuring the gain profiles of an EDFA under different channel loading conditions.

Referring to FIG. 9, shown is a block diagram illustrating an apparatus for measuring the gain profiles of an EDFA under different channel loading conditions. The apparatus includes a multichannel source 900, a splitter 902, a variable optical amplifier (VOA) 904, a WSS 906, an EDFA 908, and an optical spectrum analyzer (OSA) 910. Also shown are the optical channels 912 at the output of the multichannel source and the optical channels 914 at the output of the WSS.

The multichannel source 900 is connected to the splitter 902, which splits the optical channels into two paths. One path from the splitter contains the VOA 904. The two paths are then connected to the WSS 906. The output of the WSS is amplified by the EDFA 908, which is then measured by the OSA 910. The output of the WSS is also measured directly by the OSA without amplification.

The output of the multichannel source 900 is a series of optical channels 912 with a substantially flat power distribution. The splitter 902 splits these channels between two paths. One path is attenuated by the VOA 904 to form weaker probe signals, while the other path provides the active channels. The power of the probe signals is chosen such that it is low enough not to affect the gain profile of the EDFA, but high enough that the probe signals can be used to measure the gain for those optical channels accurately. The WSS 906 is used to select a set of active channels for the measurement. The channels 914 at the output of the WSS are a combination of active channels and probe signals, which correspond to the specific channel loading condition being measured. The optical channels 914 are amplified by the EDFA 908 before being measured by the OSA 910. The OSA 910 also measures the spectrum of optical channels 914 at the output of the WSS before amplification. The gain profile of the EDFA for the channel loading condition represented by optical channels 914 can then be calculated from the spectra measured by the OSA before and after amplification.

Gain profiles are measured for numerous representative channel loading conditions. In some cases, gain profiles for at least 1000 different channel loading conditions are measured. However, other numbers of channel loading conditions may also be measured. When selecting channel loading conditions to be measured, the number of active channels, the channel index of the active channels, and the power of the active channels are considered. Gain profiles may also be measured while varying other operating conditions of the EDFA, such as nominal gain and gain tilt. Gain profiles may also be measured for different EDFA designs.

Although the measurement apparatus illustrated in FIG. 9 is used measure the gain profile of an EDFA, in general, the gain or loss profile of any link in an optical network may be measured. These measurements may then be used to train an ANN model corresponding to that link in the optical network. An example of an ANN will now be discussed in detail below.

Figure 10:
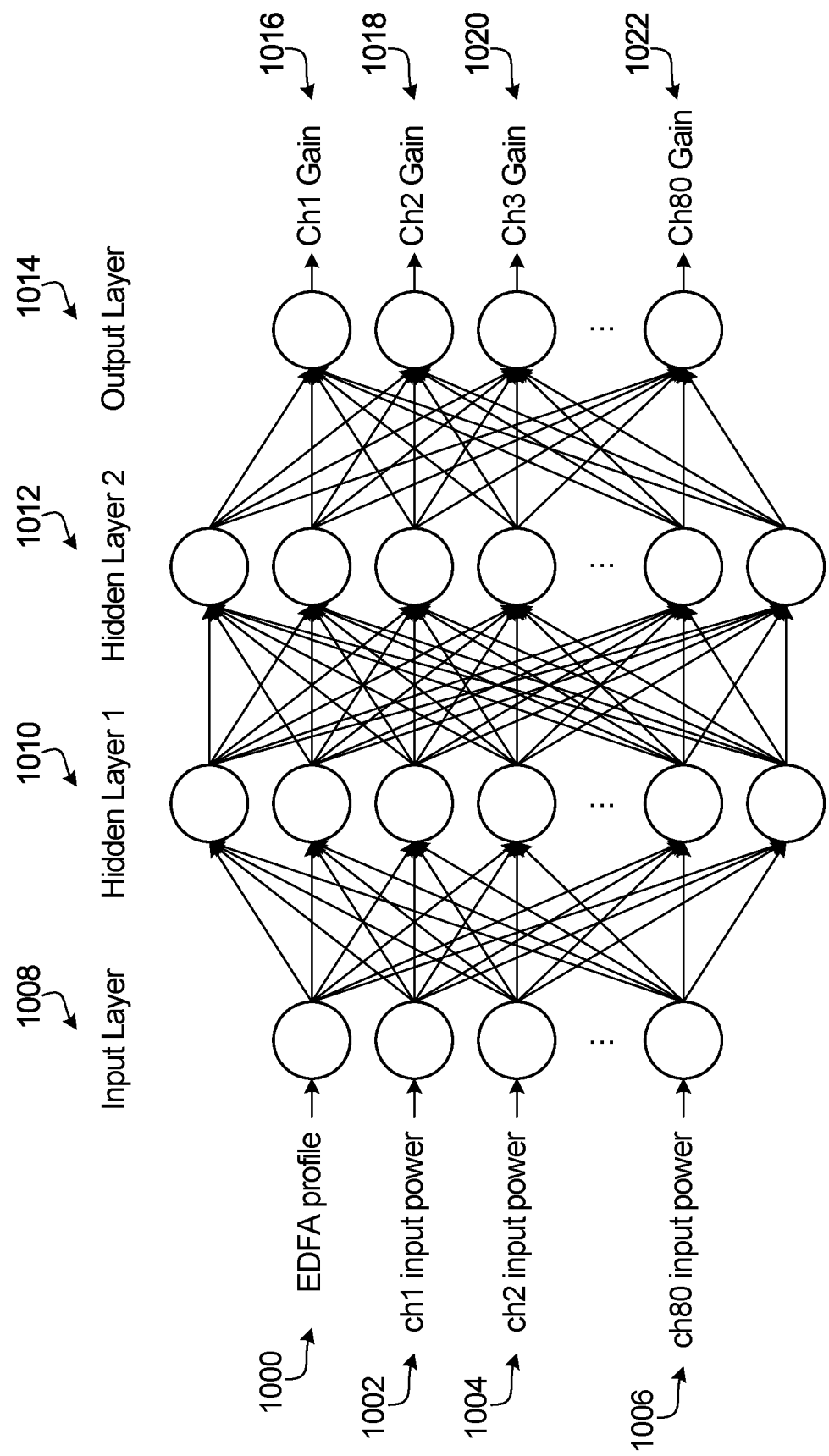
FIG. 10 is a block diagram of a multilayer perceptron (MLP) structure for an artificial neural network (ANN)

Referring to FIG. 10, shown is a block diagram of a multilayer perceptron (MLP) structure for an ANN. The ANN has inputs including an EDFA profile 1000 and input powers for all the channels (only three shown: channel index 1 input power 1002, channel index 2 input power 1004 and channel index 80 input power 1006). The ANN has 4 layers of neural cells, including input layer 1008, hidden layer 1 1010, hidden layer 2 1012 and output layer 1014. The outputs of the ANN includes channel gains for all the channels (only four shown: channel index 1 gain 1016, channel index 2 gain 1018, channel index 3 gain 1020 and channel index 80 gain 1022).

In FIG. 10, the inputs 1000,1002,1004,1006 are connected to corresponding neural cells in the input layer 1008. Each neural cell of input layer 1008 is illustrated as being connected to each neural cell of the hidden layer 1 1010. Similar connections are made between hidden layer 1 1010 and hidden layer 2 1012, and hidden layer 2 1012 and output layer 1014. The neural cells of the output layer 1014 are connected to the corresponding outputs 1016,1018,1020, 1022. However, this is simply one example of connections between the inputs, outputs and different layers of a MLP structure. In general, these connections may take on different configurations.

The MLP structure illustrated in FIG. 10 is only one example of an ANN that may be used as a numerical EDFA model. Other structures may be used without diverting from the scope of this disclosure. In addition, although FIG. 10 is directed towards an ANN model for an EDFA, an ANN may be used to model other parts of the optical network.

The inputs illustrated in FIG. 10 include an EDFA profile (which reflects the variability between EDFAs) and channel input powers, however, other EDFA operating conditions may be used as inputs. For example, total channel input power, EDFA operating temperature and gain tilt may be used as inputs. Similarly, other outputs, such as channel output powers, may be produced instead of or in addition to the channel gains shown in FIG. 10.

The numbers of neural cells in layers 1008,1010,1012, 1014 of FIG. 10 are generally tunable. In some embodiments, the number of neural cells in the input layer is the same as the number of inputs, and the number of neural cells in the output layer is the same as the number of outputs. In further embodiments, the number of neural cells in hidden layer 1 is substantially the same as the number of neural cells in the input layer, and the number of neural cells in hidden layer 2 is between the number of neural cells in hidden layer 1 and the number of neural cells in the output layer. However, other numbers of neural cells in layers 1008,1010, 1012,1014 may also be used. Moreover, the number of hidden layers may also vary. For example, a MLP structure with greater or less than two hidden layers may be used.

The ANN of FIG. 10 takes inputs 1000,1002,1004,1006 and processes these inputs in the neural cells of layers 1008,1010,1012,1014 to produce the outputs 1016,1018, 1020,1022. Each neural cell includes an activation function that acts on the input(s) to the neural cell to produce the output(s) of the neural cell. In some embodiments, the activation function is a sigmoid function having the following form:

$$f(x) = \frac{1}{1 + e^{-(w*x+b)}},$$

where x is the input to the neural cell, f(x) is the output from the neural cell, w is the weight value of the neural cell and b is the bias of the neural cell. However, other activation functions may also be used. During the model training process, the weight value and the bias value of the neural cell are set such that the model produces accurate outputs. In some implementations, x, w and b may be vectors that represent the different inputs to the neural cell. The model training process will now be described in detail.

Figure 11:
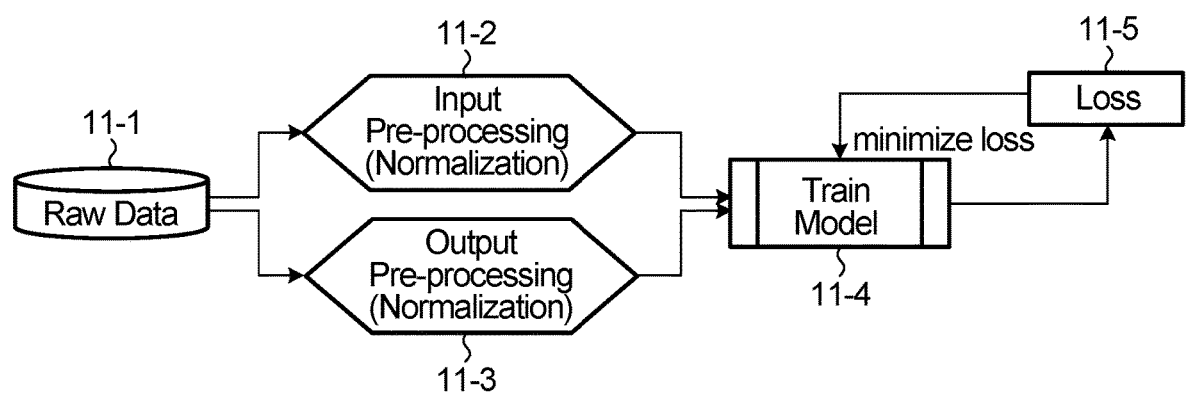
FIG. 11 is a flow diagram showing a method for training an ANN model.

Referring to FIG. 11, shown is a method for training an ANN model. FIG. 11 includes raw data in block 11-1, input pre-processing in block 11-2, output pre-processing in block 11-3, model training in block 11-4 and a loss function in block 11-5.

The raw data in block 11-1 is collected from a measurement of a link in an optical network, for example, from the measurement of an EDFA using the apparatus of FIG. 9. The raw data includes input data and output data, which corresponds to the inputs and outputs of the ANN model being trained. Examples of inputs and outputs for an ANN model for an EDFA are discussed in detail above with reference to FIG. 10. The input data selected from the raw data is fed to block 11-2 for pre-processing. The pre-processing formats the input data to increase the efficiency of the ANN. For example, the input data may be normalized to the range of [−1, 1]. Similar pre-processing is performed in block 11-3 on the output data selected from the raw data.

The pre-processed input data and output data from blocks 11-2 and 11-3, respectively, is fed to the model training platform in block 11-4. Using the pre-processed input data, the ANN model calculates a predicted output. In some embodiments, the ANN model illustrated in FIG. 10 is used in block 11-4. In block 11-5, the pre-processed output data from block 11-3 is compared with the predicted output from the ANN model in block 11-4 to produce a loss function. This loss function reflects the difference between the measured output from block 11-3 and the predicted output from the ANN of block 11-4. The loss function from block 11-5 is then fed back to ANN model in block 11-4 to train the ANN model. The model training process uses a back propagate algorithm to reduce the loss function. In the example of the ANN of FIG. 10, the back propagate algorithm may adjust the weight and bias values in the neural cells to reduce the loss function.

The model training process of FIG. 11 is repeated through numerous iterations using different sets of raw data. In some embodiments, the different sets of raw data may correspond to the gain profile of an EDFA measured using the apparatus of FIG. 9 at different operating conditions. Accordingly, the ANN is trained to model the gain profile of the EDFA for a variety of different operating conditions. After training is completed, the ANN model may be used in an application, such as in a MBE controller.

Figure 12:
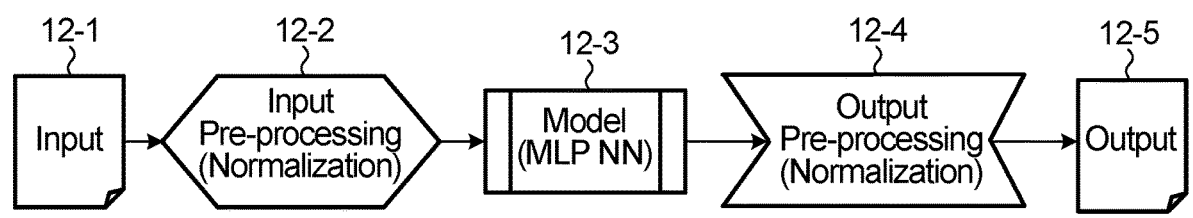
FIG. 12 is a flow diagram showing a method for using an ANN model to calculate an output from a given input.

Referring now to FIG. 12, shown is a method of using an ANN model to calculate an output from a given input. The method includes receiving input data in block 12-1, input pre-processing in block 12-2, modeling in block 12-3, output post-processing in block 12-4, and producing output data in block 12-5. These blocks are connected sequentially.

The inputs from block 12-1 are fed to block 12-2 for pre-processing. This pre-processing corresponds to the pre-processing performed in block 11-2 of FIG. 11 used during model training. For example, pre-processing may include normalizing the data to the range [−1, 1]. The pre-processed data is then fed to the model in block 12-3, which calculates an output. In block 12-4, the calculated output from the model is post-processed, which may include de-normalization. The post-processed data is then output in block 12-5.

In general, the input data in block 12-1 may correspond to operating conditions the ANN model was not specifically trained with. However, the ANN model will still be able to calculate an accurate output for this input, provided the model has received sufficient training.

In some embodiments, the method of FIG. 12 is performed by a prediction module in an MBE controller. The model in block 12-3 may correspond to the ANN model of an EDFA illustrated in FIG. 10. However, the model in block 12-3 may also correspond to other parts of an optical network. Examples of inputs and outputs for an ANN model for an EDFA are discussed in detail above with reference to FIG. 10. The model may be used by the MBE controller to calculate a gain profile for the EDFA for given operating conditions. This gain profile may then be used to predict a change in gain applied by the EDFA for at least one optical channel that will result upon reconfiguring the optical network.

Numerous modifications and variations of the present disclosure are possible in light of the above teachings. It is therefore to be understood that within the scope of the appended claims, the disclosure may be practiced otherwise than as specifically described herein.

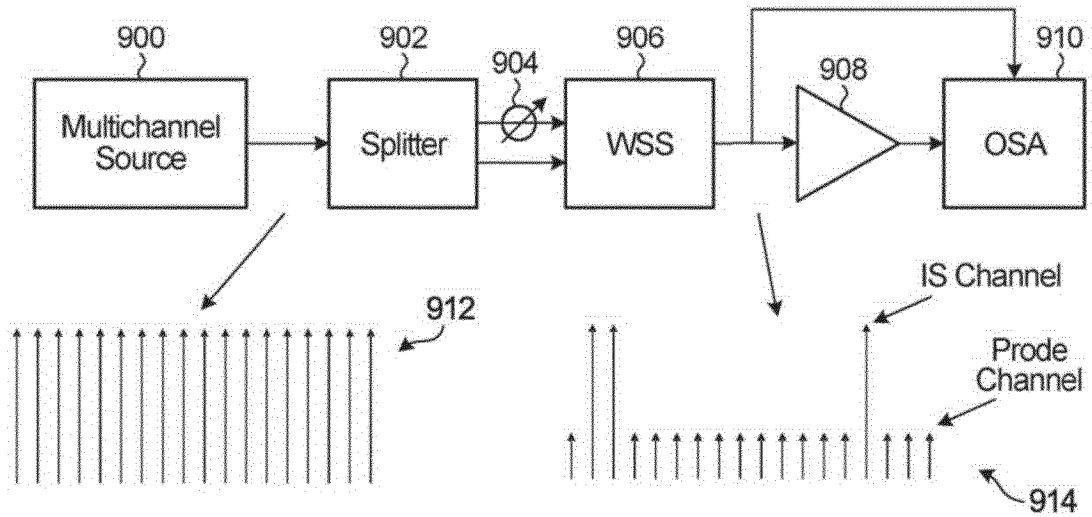

The invention claimed is:

1. A method for reconfiguring a link with channel loading dependent gain in an optical network, the method comprising:
predicting a change of optical power of at least one optical channel in the link due to optical gain change that will be caused by a particular reconfiguration of optical channels in the link;
adjusting optical power of the at least one optical channel in the link to at least partially offset the predicted change of optical power of the at least one optical channel in the link due to optical gain change caused by the particular reconfiguration of optical channels in the link; and
reconfiguring the optical channels in the link according to the particular reconfiguration, the at least one optical channel remaining active following reconfiguration.

2. The method of claim 1, wherein the reconfiguring comprises adding a first set of optical channels to the link.

3. The method of claim 1, wherein the reconfiguring comprises dropping a second set of optical channels from the link.

4. The method of claim 1, wherein adjusting the optical power of the at least one optical channel comprises adjusting an optical power of each optical channel of the optical channels in the link remaining active following reconfiguration.

5. The method of claim 1, wherein adjusting the optical power of the at least one optical channel comprises adjusting an attenuation level of the at least one optical channel in a wavelength selective switch.

6. The method of claim 5, further comprising limiting a number of optical channels added to or dropped from the link during the reconfiguration of the optical channels in the link, such that a power excursion of the at least one optical channel due to the reconfiguration of the optical channels in the link is below a predefined threshold.

7. The method of claim 1, wherein the link is an optical multiplexing section comprising at least one optical amplifier.

8. The method of claim 7, wherein the at least one optical amplifier comprises an erbium-doped optical amplifier.

9. The method of claim 7, wherein the predicted change of optical power of the at least one optical channel in the link due to the optical gain change comprises a predicted change of optical power of the at least one optical channel in the link due to optical gain change of the at least one optical amplifier.

10. The method of claim 1, wherein:
the link is an optical multiplexing section comprising at least one optical amplifier and at least one section of optical fiber;
wherein the at least one optical amplifier comprises an erbium-doped optical amplifier; and
wherein the predicted change of optical power of the at least one optical channel in the link due to the optical gain change comprises a predicted change of optical power of the at least one optical channel in the link due to optical gain change of the at least one optical amplifier and the at least one section of optical fiber.

11. The method of claim 1, wherein the adjusting occurs, at least in part, in parallel with reconfiguring the optical channels in the link.

12. The method of claim 1, further comprising calculating the predicted change of optical power of the at least one optical channel in the link due to the optical gain change using a numerical model.

13. The method of claim 12, wherein calculating the predicted change of optical power of the at least one optical channel in the link due to the optical gain change using the numerical model comprises calculating the predicted change of optical power of the at least one optical channel in the link due to the optical gain change using an artificial neural network.

14. The method of claim 1 further comprising:
dividing a set of optical channels to be added to the link into a plurality of subsets of optical channels to be added to the link in a corresponding plurality of reconfigurations;
performing the plurality of reconfigurations by performing a corresponding plurality of iterations of the method of claim 1, the plurality of iterations including one iteration for each of the plurality of reconfigurations to add the corresponding subset of optical channels.

15. The method of claim 14, wherein dividing the set of optical channels comprises limiting the size of each of the plurality of subsets such that in each iteration, a power excursion of each of the optical channels in the link due to the reconfiguration for each iteration is below a predefined threshold.

16. An optical network controller comprising:
a prediction module configured to obtain a predicted change of optical power of at least one optical channel in a link with channel loading dependent gain due to optical gain change caused by a particular reconfiguration of optical channels in the link;
a power adjuster configured to adjust an optical power of the at least one optical channel based on the predicted change of optical power of the at least one optical channel in the link due to the optical gain change; and
a switch configured to reconfigure the optical channels in the link such that the at least one optical channel remains active following reconfiguration according to the particular reconfiguration.

17. The optical network controller of claim 16, wherein the switch is configured to add a first set of optical channels to the link.

18. The optical network controller of claim 16, wherein the switch is configured to drop a second set of optical channels from the link.

19. The optical network controller of claim 16, wherein the prediction module, the power adjuster and the switch are parts of a reconfigurable optical add drop multiplexer node.

20. The optical network controller of claim 16, wherein the power adjuster is further configured to adjust an optical power of each optical channel of the optical channels in the link remaining active following reconfiguration.

21. The optical network controller of claim 16, wherein the power adjuster and the switch comprise a same wavelength selective switch configured to adjust an attenuation level of the at least one optical channel.

22. The optical network controller of claim 16, wherein the power adjuster is further configured to adjust the optical power of the at least one optical channel in parallel with the switch reconfiguring the optical channels in the link; and the prediction module is further configured to obtain the predicted change of optical power of the at least one optical channel in the link due to the optical gain change by calculating the prediction using a numerical model.

23. The optical network controller of claim 16, wherein the numerical model comprises an artificial neural network.

* * * * *

UNITED STATES PATENT AND TRADEMARK OFFICE
CERTIFICATE OF CORRECTION

PATENT NO. : 10,630,416 B2
APPLICATION NO. : 15/950736
DATED : April 21, 2020
INVENTOR(S) : Jiang et al.

It is certified that error appears in the above-identified patent and that said Letters Patent is hereby corrected as shown below:

On the Title Page

Delete the title page and substitute therefore with the attached title page.

In the Claims

Replace Column 15, Line 50-Column 18, Line 27, (approx.) with the following Claims:

1. A method for reconfiguring a link with channel loading dependent gain in an optical network, the method comprising:
    predicting a change of optical power of at least one optical channel in the link due to optical gain change that will be caused by a particular reconfiguration of optical channels in the link;
    adjusting optical power of the at least one optical channel in the link to at least partially offset the predicted change of optical power of the at least one optical channel in the link due to optical gain change caused by the particular reconfiguration of optical channels in the link; and
    reconfiguring the optical channels in the link according to the particular reconfiguration, the at least one optical channel remaining active following reconfiguration.
2. The method of claim 1, wherein the reconfiguring comprises adding a first set of optical channels to the link.
3. The method of claim 1, wherein the reconfiguring comprises dropping a second set of optical channels from the link.
4. The method of claim 1, wherein adjusting the optical power of the at least one optical channel comprises adjusting an optical power of each optical channel of the optical channels in the link remaining active following reconfiguration.
5. The method of claim 1, wherein adjusting the optical power of the at least one optical channel comprises adjusting the optical power by an amount equal to a specified negative fraction of the predicted change of optical power of the at least one optical channel due to the optical gain change.
6. The method of claim 5, wherein the specified negative fraction is -1/2.
7. The method of claim 1, wherein adjusting the optical power of the at least one optical channel comprises adjusting an attenuation level of the at least one optical channel in a wavelength selective Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office* switch.

8. The method of claim 7, further comprising limiting a number of optical channels added to or dropped from the link during the reconfiguration of the optical channels in the link, such that a power excursion of the at least one optical channel due to the reconfiguration of the optical channels in the link is below a predefined threshold.

9. The method of claim 1, wherein the link is an optical multiplexing section comprising at least one optical amplifier.

10. The method of claim 9, wherein the at least one optical amplifier comprises an erbium-doped optical amplifier.

11. The method of claim 9, wherein the predicted change of optical power of the at least one optical channel in the link due to the optical gain change comprises a predicted change of optical power of the at least one optical channel in the link due to optical gain change of the at least one optical amplifier.

12. The method of claim 1, wherein:

the link is an optical multiplexing section comprising at least one optical amplifier and at least one section of optical fiber;

wherein the at least one optical amplifier comprises an erbium-doped optical amplifier; and wherein the predicted change of optical power of the at least one optical channel in the link due to the optical gain change comprises a predicted change of optical power of the at least one optical channel in the link due to optical gain change of the at least one optical amplifier and the at least one section of optical fiber.

13. The method of claim 1, wherein the adjusting occurs, at least in part, before reconfiguring the optical channels in the link.

14. The method of claim 1, wherein the adjusting occurs, at least in part, in parallel with reconfiguring the optical channels in the link.

15. The method of claim 1, further comprising calculating the predicted change of optical power of the at least one optical channel in the link due to the optical gain change using a numerical model.

16. The method of claim 15, wherein calculating the predicted change of optical power of the at least one optical channel in the link due to the optical gain change using the numerical model comprises calculating the predicted change of optical power of the at least one optical channel in the link due to the optical gain change using an artificial neural network.

17. The method of claim 1 further comprising:

dividing a set of optical channels to be added to the link into a plurality of subsets of optical channels to be added to the link in a corresponding plurality of reconfigurations;

performing the plurality of reconfigurations by performing a corresponding plurality of iterations of the method of claim 1, the plurality of iterations including one iteration for each of the plurality of reconfigurations to add the corresponding subset of optical channels.

18. The method of claim 17, wherein dividing the set of optical channels comprises limiting the size of each of the plurality of subsets such that in each iteration, a power excursion of each of the optical channels in the link due to the reconfiguration for each iteration is below a predefined threshold.

19. An optical network controller comprising:

a prediction module configured to obtain a predicted change of optical power of at least one optical channel in a link with channel loading dependent gain due to optical gain change caused by a particular reconfiguration of optical channels in the link;

a power adjuster configured to adjust an optical power of the at least one optical channel based on the predicted change of optical power of the at least one optical channel in the link due to the optical gain change; and a switch configured to reconfigure the optical channels in the link such that the at least one optical channel remains active following reconfiguration according to the particular reconfiguration.

20. The optical network controller of claim 19, wherein the switch is configured to add a first set of optical channels to the link.

21. The optical network controller of claim 19, wherein the switch is configured to drop a second set of optical channels from the link.

22. The optical network controller of claim 19, wherein the prediction module, the power adjuster and the switch are parts of a reconfigurable optical add drop multiplexer node.

23. The optical network controller of claim 19, wherein the power adjuster is further configured to adjust an optical power of each optical channel of the optical channels in the link remaining active following reconfiguration.

24. The optical network controller of claim 19, wherein the power adjuster is further configured to adjust the optical power of the at least one optical channel by an amount equal to a specified negative fraction of the predicted change of optical power of the at least one optical channel in the link due to the optical gain change.

25. The optical network controller of claim 19, wherein the power adjuster and the switch comprise a same wavelength selective switch configured to adjust an attenuation level of the at least one optical channel.

26. The optical network controller of claim 19, wherein the power adjuster is further configured to adjust the optical power of the at least one optical channel before the switch reconfigures the optical channels in the link.

27. The optical network controller of claim 19, wherein the power adjuster is further configured to adjust the optical power of the at least one optical channel in parallel with the switch reconfiguring the optical channels in the link; and
the prediction module is further configured to obtain the predicted change of optical power of the at least one optical channel in the link due to the optical gain change by calculating the prediction using a numerical model.

28. The optical network controller of claim 19, wherein the numerical model comprises an artificial neural network.

(12) United States Patent
Jiang et al.

(10) Patent No.: US 10,630,416 B2
(45) Date of Patent: Apr. 21, 2020

(54) SYSTEM AND METHOD FOR OPTICAL CHANNEL RECONFIGURATION

(71) Applicants: Zhiping Jiang, Kanata (CA); Yuren You, Ottawa (CA)

(72) Inventors: Zhiping Jiang, Kanata (CA); Yuren You, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/950,736

(22) Filed: Apr. 11, 2018

(65) Prior Publication Data
US 2019/0319734 A1   Oct. 17, 2019

(51) Int. Cl.
*H04J 14/02* (2006.01)
*H04Q 11/00* (2006.01)
*H04B 10/25* (2013.01)

(52) U.S. Cl.
CPC ........ *H04J 14/0212* (2013.01); *H04B 10/25* (2013.01); *H04J 14/0221* (2013.01); *H04Q 11/0062* (2013.01); *H04Q 2011/0069* (2013.01)

(58) Field of Classification Search
CPC .. H04J 14/0212; H04J 14/0221; H04B 10/25; H04Q 11/0062; H04Q 2011/0069
See application file for complete search history.

(56) References Cited

U.S. PATENT DOCUMENTS

| | | | | |
|---|---|---|---|---|
| 6,040,933 A * | 3/2000 | Khaleghi | | H04J 14/0221 398/1 |
| 6,859,622 B1 * | 2/2005 | Jiang | | H04B 10/2537 398/193 |
| 9,503,188 B2 | 11/2016 | Jiang et al. | | |
| 2003/0151799 A1 | 8/2003 | Wight et al. | | |
| 2007/0280687 A1 | 12/2007 | Wan et al. | | |
| 2009/0324219 A1 * | 12/2009 | Jiang | | H04J 14/0221 398/34 |
| 2012/0321319 A1 * | 12/2012 | Jiang | | H04B 10/0793 398/79 |

(Continued)

FOREIGN PATENT DOCUMENTS

| | | |
|---|---|---|
| CN | 1419354 A | 5/2003 |
| CN | 101455005 A | 6/2009 |
| EP | 1439655 A2 | 7/2004 |

*Primary Examiner* — Mina M Shalaby

(57) ABSTRACT

In wavelength division multiplexing (WDM) systems, one optical multiplexing section (OMS) can support several channels. During a network reconfiguration, the number or channel index of the channels in the OMS may change, which may result in a change in gain for other channels in the OMS due to the channel loading dependant gain properties of many optical amplifiers. Equalization is therefore required in order to reduce power excursion for the channels in the OMS. Using a model for the channel loading dependent gain of optical amplifiers, equalization may be performed more quickly than using measurement-based equalization methods. The model predicts the change in gain for the channels in an OMS following network reconfiguration, and allows for an equalizer to quickly or pre-emptively adjust for the changes. This model may include an artificial neural network, which is trained using some of the possible channel loading conditions for the OMS.

28 Claims, 11 Drawing Sheets